United States Patent

Masters et al.

Patent Number: 5,872,930
Date of Patent: Feb. 16, 1999

[54] LOAD BALANCING BETWEEN E-MAIL SERVERS WITHIN A LOCAL AREA NETWORK

[75] Inventors: Steven Paul Masters, Kent; Eric Neil Lockard, Redmond, both of Wash.

[73] Assignee: Microsoft Corporation, Redmond, Wash.

[21] Appl. No.: 680,233

[22] Filed: Jul. 11, 1996

[51] Int. Cl.[6] .................................................. H04L 12/56
[52] U.S. Cl. ..................................... 395/200.53; 370/228
[58] Field of Search ......................... 395/200.53, 200.36; 370/253, 901, 438

[56] References Cited

U.S. PATENT DOCUMENTS

| | | | |
|---|---|---|---|
| 4,484,326 | 11/1984 | Turner | 370/253 |
| 4,745,593 | 5/1988 | Stewart | 370/244 |
| 5,029,075 | 7/1991 | Hirasawa | 395/200.71 |
| 5,218,699 | 6/1993 | Brandle et al. | 395/650 |
| 5,247,676 | 9/1993 | Ozur et al. | 395/650 |
| 5,253,248 | 10/1993 | Dravida et al. | 370/228 |
| 5,265,033 | 11/1993 | Vajk et al. | 395/200.36 |
| 5,283,856 | 2/1994 | Gross et al. | 395/51 |
| 5,317,566 | 5/1994 | Joshi | 370/238 |
| 5,381,404 | 1/1995 | Sugano et al. | 370/238 |
| 5,621,727 | 4/1997 | Vaudreuil | 370/401 |

OTHER PUBLICATIONS

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

Shirley, John and Ward Rosenberry. "Microsoft PRC Programming Guide", O'Reilly & Associates, Inc., Sebastopol, CA,1995.

*Primary Examiner*—William M. Treat
*Assistant Examiner*—David M. Ovedovitz
*Attorney, Agent, or Firm*—Workman, Nydegger & Seeley

[57] ABSTRACT

Message traffic is balanced between a plurality of alternative message routes connecting a plurality sites in an electronic messaging system by assigning a cost to each potential message route between the plurality of sites. The cost defines a desired relative frequency of usage for the corresponding message route. A weight is calculated for each potential message route based on its assigned cost of connecting one site to another site. A message route between the one site and the other site is chosen based on the collective calculated weights and a message is transmitted over the chosen message route from one site to the other site.

25 Claims, 12 Drawing Sheets

LOAD BALANCING BETWEEN E-MAIL SERVERS WITHIN A LOCAL AREA NETWORK

BACKGROUND

This invention relates to regulating the flow of information between electronic mail ("e-mail") servers within a local area network ("LAN").

A typical e-mail system as shown in FIG. 1 includes one or more interconnected servers 101 each serving one or more clients 103 (e.g., individual workstations). A client in turn may interact with an end-user—a human operator that seeks to use the e-mail system to communicate with other end-users, for example. The collection of interconnected servers 101 and their respective clients 103 constitute a single "site" 105 which may communicate with one or more other sites within the same LAN. A site is delimited by a unique e-mail address space—that is, each server 101 within a single site 105 shares the same e-mail address space.

In a typical application of an e-mail system, an end-user uses an associated client 103 connected to a particular server 101 within site 105 to send an e-mail message, or some other type of information packet, to another end-user who may be connected through a client to the same server or to a different server. The server on which the message originates is the "originating" server and the server that receives the message is the "destination" server. The destination server may be within the same site (the "local" or "source" site) as the originating server or at a different site (a "remote" or "destination" site).

Each server within a site has a direct communication path 107 to every other server within that same site. This allows messages to be delivered in a single "hop" between any two servers within the site. A mechanism that may be used to transport messages from one server to another, either within a single site or across site boundaries, is the remote procedure call ("RPC"). An RPC passes the thread of execution from one memory address space to another memory address space while maintaining program context. Two servers that may communicate directly with each other using an RPC are said to have direct RPC connectivity. The RPC protocol is discussed in detail in "Microsoft RPC Programming Guide," John Shirley and Ward Rosenberry, O'Reilly & Associates, Inc., Sebastopol, Calif., 1995, which is incorporated herein by reference.

A conventional e-mail system such as that shown in FIG. 2 employs a "one-to-one" intersite connectivity model in which every server in site 205 has direct RPC connectivity (via communication paths 107) with every server in site 215. The one-to-one connectivity model, while acceptable for LANs having only a few sites, does not scale up gracefully and thus is not well suited as a general model for intersite communications. As more sites are added to the LAN, the number of direct communication paths required to maintain one-to-one intersite connectivity increases dramatically and quickly becomes unmanageable if the number of sites grows to more than just a few.

In the two site configuration of FIG. 2, for example, eight separate communication paths are necessary to maintain one-to-one connectivity between site 205 and site 215. If a third site having four servers were added to the LAN, the number of communication paths required to maintain one-to-one intersite connectivity would increase to 32—a four-fold increase through the addition of just one extra site. The amount of network and operating system resources that are consumed by the managment of these connections would increase proportionately with the total number of connections maintained. Moreover, a substantial amount of manual administrative overhead is imposed on the system administrator who must keep the list of servers in the remote sites up to date with respect to the actual servers present in those sites. Consequently, the burden imposed on the e-mail system's resources quickly would become unmanageable if the number of sites in FIG. 2 was increased beyond just 2 or 3.

In any multi-site e-mail system, a system administrator is faced with a challenge of determining an efficient and cost-effective manner of transporting e-mail traffic from one site to another. What is needed is a set of tools and techniques that facilitate efficient intersite communications in a LAN having an arbitrarily large number of sites.

SUMMARY

In one aspect of the invention, message traffic is balanced between a plurality of alternative message routes connecting a plurality of sites in an electronic messaging system by assigning a cost to each potential message route between the plurality of sites. The assigning may be performed off-line by a system administrator. The cost defines a desired relative frequency of usage for the corresponding message route. A probability of choosing a message route having a low cost is higher than a probability of choosing a message route having a high cost. A weight is calculated for each potential message route based on its assigned cost and a message route between the one site and the other site is chosen based on the collective calculated weights. A message is transmitted over the chosen message route from one site to the other site, for example, using a remote procedure call. This action causes the message to move from one e-mail address space to another e-mail address space.

Special cost values may be assigned to one or more of the message routes, for example, to cause the associated message route to be excluded as a possible message route choice. Alternatively, the special cost may cause the associated message route to be consistently chosen. In any event, these special cost values are excluded from the weight calculations.

The weight calculations for a particular message route between two sites may include comparing that message route's cost to the combined costs for all potential message routes between the two sites. In particular, the message route's cost may be subtracted from a sum of the costs for the plurality of message routes between the two sites.

In one embodiment, the choosing of a particular message route involves constructing a logical weight table having a number of positions equal to a sum of the weights for the plurality of message routes, associating a number of positions in the weight table to each message route equal to its weight. A random number is then generated and compared with the weight table. The message route that has an assigned position in the weight table corresponding to the random number is picked as the route to use for the communication sequence (i.e., one or more messages).

As a result, the choosing of a message route is probabilistic such that an actual relative frequency of use for each message route converges toward the desired relative frequency of use for each message route as a cumulative number of transmissions from one site to another site increases.

Once the costs have been assigned, and their respective weights have been calculated, the message route for each successive communication sequence will be newly chosen using the same costs and weights until they are reassigned by the system administrator.

In another aspect of the invention, a method for load balancing in an electronic messaging system includes, in each server in a network which can send messages to other servers in the network, assigning a cost to each potential transmission route from one server to another server and storing a record of the assigned cost for each potential transmission route. A copy of these costs may be stored on each server in the network. For one server having a message to be sent, the set of potential transmission routes from the one server to a server addressed by the message is determined. At the sending server, a desired relative frequency of use is established for each potential transmission route in the set based on its assigned cost relative to the other assigned costs. A transmission route is chosen probabilistically from among the set such that an actual relative frequency of use for each potential transmission route converges toward the desired relative frequency of use for each transmission route as a cumulative number of transmissions from the one server to the addressed server increases. After it has been chosen, one or more messages are sent over the transmission route. The steps of choosing a transmission route and sending messages over that route may be repeated for each server in the network that has a message to be sent to another server in the network.

In another aspect of the invention, an electronic messaging system includes a plurality of sites each of which includes multiple servers that are capable of exchanging messages. Each site occupying a unique address space. The system includes a plurality of communication paths connecting the plurality of sites, each communication path having a preassigned cost that represents a desired relative frequency of use for that communication path. The number of communication paths between a pair of sites is less than the number of servers in one site in the pair multiplied by the number of servers in the other site in the pair. Message traffic is distributed across the plurality of communication paths based on the collective preassigned costs of the plurality of communications paths.

In the messaging system, each of the plurality of servers has direct connectivity to every other server within a same site. At least one of the plurality of servers in a particular site is a bridgehead server from which the plurality of communication paths for that site emanate exclusively. The messaging system may include a target server, which may be the same or different server as the bridgehead server, and into which the plurality of communication paths lead.

Advantages of the invention may include one or more of the following:

By reducing the number of intersite connections, the connectivity models described herein simplify an e-mail network without decreasing its functionality. Each server continues to have a communication path, either direct or indirect, to every other server within the network. At the same time, these connectivity models provide the system administrator with increased control and flexibility over the flow of e-mail message traffic between different sites in the network. The attendant reduction in complexity makes the network easier to maintain and thus reduces the load on the e-mail system and reduces the practical burdens faced by the system administrator. Techniques for managing and simplifying the flow of e-mail message traffic are described further in commonly-assigned U.S. Ser. No. 08/680,232, filed Jul. 11, 1996, entitled "AUTOMATIC UPDATING AND USE OF ROUTING INFORMATION," which is incorporated herein by reference.

Moreover, depending on the particular configuration implemented, the option of having redundant intersite communication paths is available to the system administrator. This available redundancy may be used to enhance the fault tolerance of the e-mail system.

Because these connectivity models are susceptible to many different implementations (e.g., one-to-many, few-to-many, many-to-one, many-to-few, etc.), they provide a system administer with a rich set of tools that enhances the administrator's control over the network. The administrator may use one or more of these connectivity models to realize certain system-wide policy objectives, even if the e-mail network is composed of several disparate site configurations.

For example, the administrator may implement load balancing across two or more different communications paths based on their relative capabilities. Communication paths leading to or from servers that possess greater processing power or bandwidth may be used at a proportionately larger frequency over paths associated with less powerful servers. Certain communication paths may be designated to handle all message traffic under normal circumstances, with other servers providing fall back communications paths if failure occurs. Other communication paths may be designated as unavailable except as a last resort—i.e., only when all of the other potentially available communications paths have failed.

The load balancing may be based on a cost--weighted technique which lets the administrator distribute message traffic across multiple communications paths simply by preassigning a cost value to each of the potentially available paths. In this manner, the administrator may achieve a rationalized distribution of message traffic across the e-mail network.

Other advantages and features will become apparent from the following description, including the drawings and claims.

DETAILED DESCRIPTION

Figure 1:
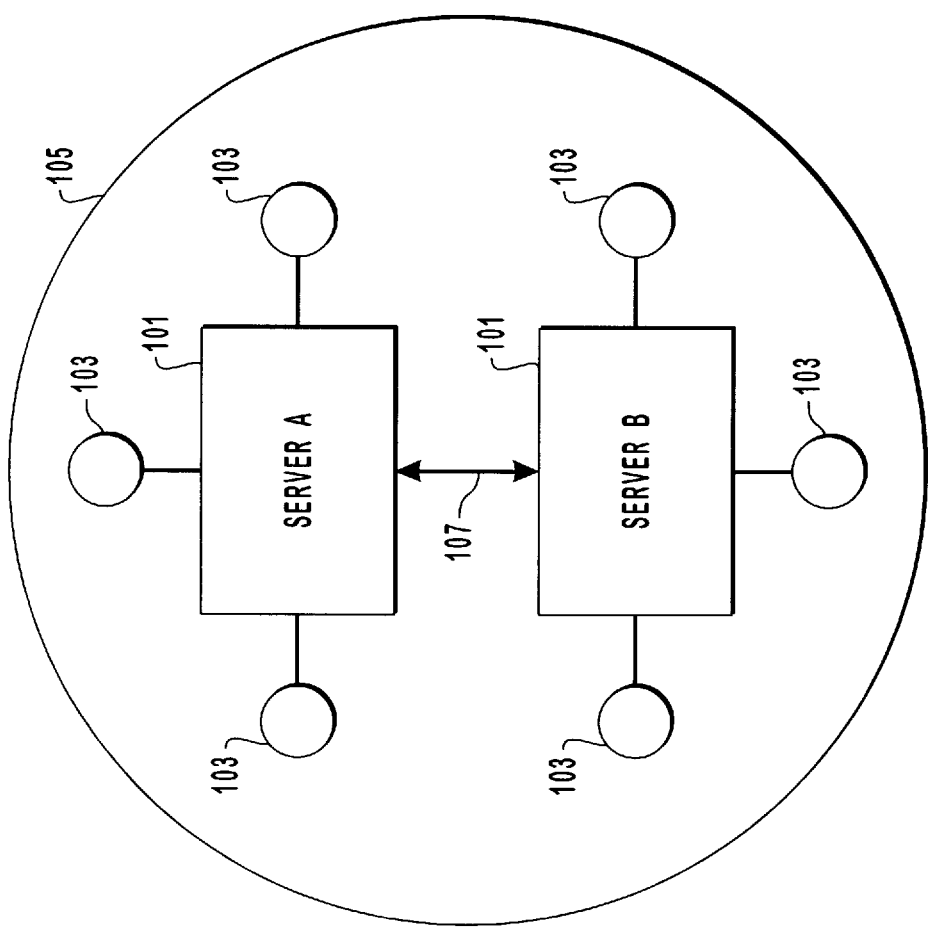
FIGS. 1–4 are logical block diagrams showing examples of e-mail system configurations.
Figure 2:
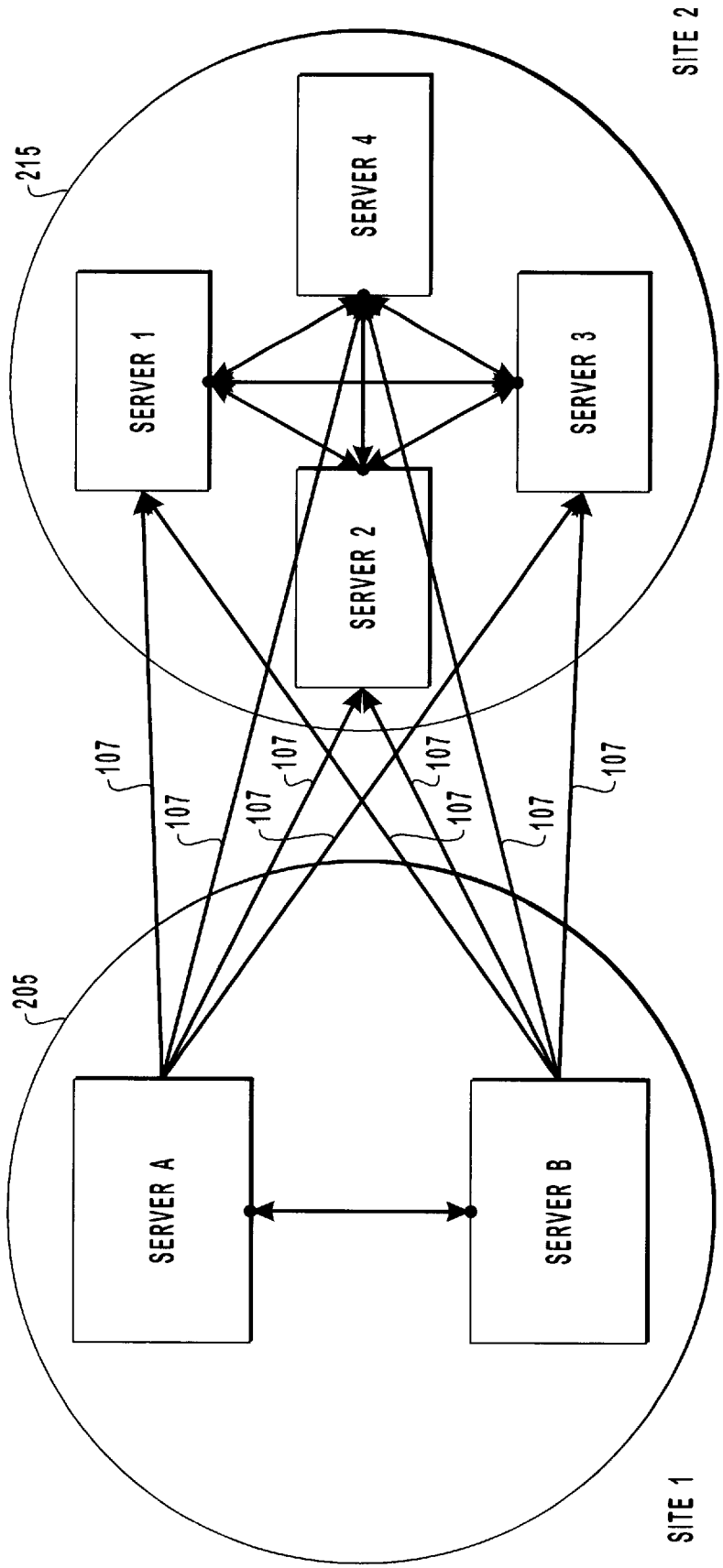
Figure 3:
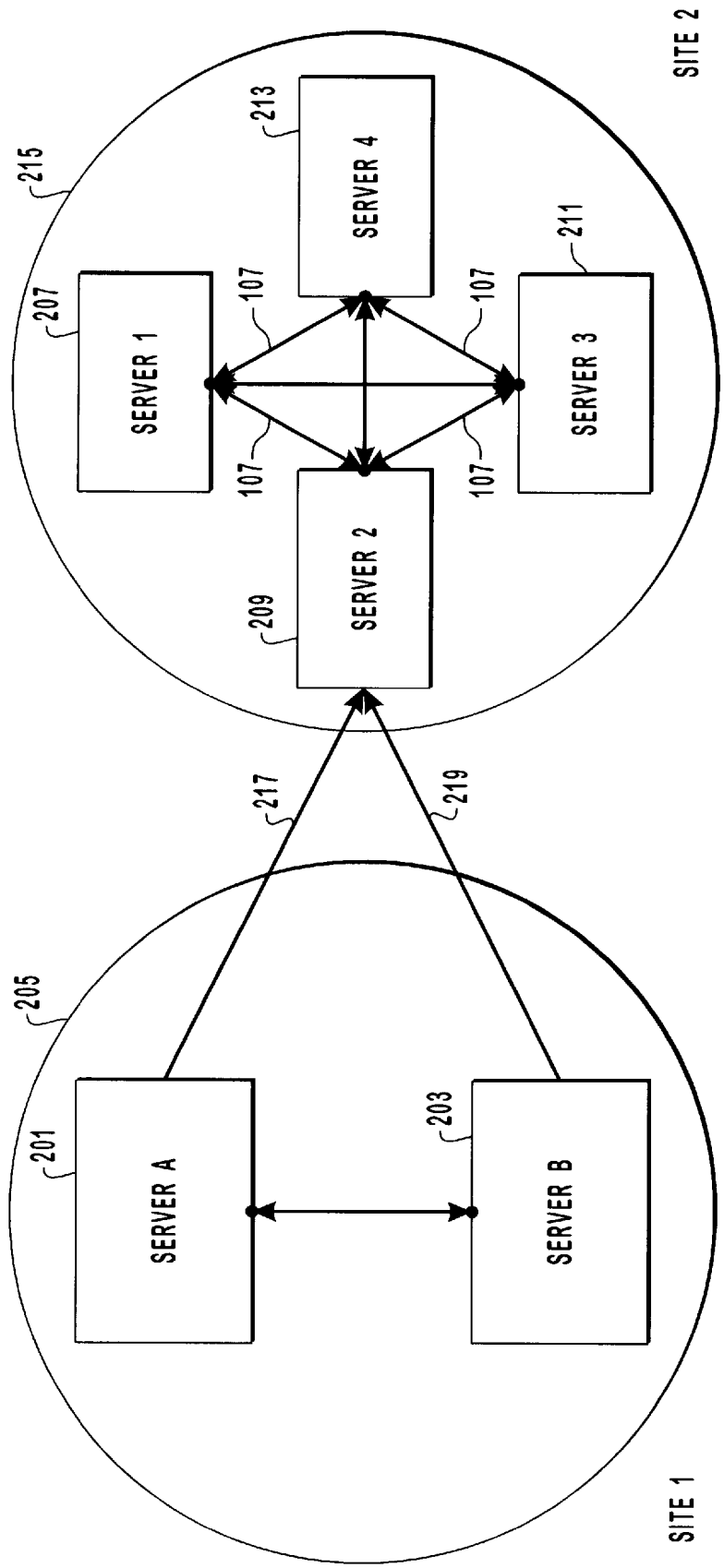

FIG. 3 illustrates an alternative configuration, the "many-to-one" intersite connectivity model, that may be used in place of the conventional one-to-one connectivity model. In contrast to the complexity of the one-to-one model, the simplified many-to-one model allows an arbitrarily large number of sites to be added to a LAN without unduly increasing the number of intersite communication paths that are necessary to maintain full communications capability between the sites.

In the many-to-one intersite connectivity model, only one server in the destination site has a direct communication path from servers in the source site. All other destination servers must receive their respective email traffic through an intermediate (or "target") server designated for that purpose. As a result, the number of direct intersite communication paths is reduced considerably which in turn decreases the complexity of the overall system, minimizes the load on the e-mail system and simplifies the system administrator's job.

As shown in FIG. 3, each of Server A (201) and Server B (203) in source site 205 has a direct communication path 217, 219 only to a single server in the destination site 215—namely, Server 2 (209). Because Server 2 has by design a direct intrasite communication path 107 to each of the other Servers 1, 3 and 4 (207, 211 and 213, respectively) within destination site 215, incoming messages from source site 205 will be received first by Server 2 and then distributed to Servers 1, 3 and/or 4 as appropriate.

Because in the many-to-one configuration all e-mail message traffic flowing between servers in source site 205 and servers in destination site 215 is routed through a single target server (e.g., Server 2 in FIG. 3), it may become overloaded and unable to execute its other tasks in a timely manner when message traffic becomes heavy. In that case, another alternative configuration, the "many-to-few" intersite connectivity model, provides a solution to the potential overloading problem.

Under the many-to-few approach, each server in a source site has direct RPC connectivity to more than one server, but fewer than all of the servers, in the destination site. In the example shown in FIG. 4, each of Server A (201) and Server B (203) in source site 205 has a direct communication path to two servers in destination site 215—namely, communication paths 217 and 223 to Server 2 (209) and communication paths 219 and 221 to Server 1 (207).

This configuration provides at least three advantages. First, in the same manner as the many-to-one connectivity model, the many-to-few configuration reduces the number of intersite communication paths that are maintained in comparison with the one-to-one connectivity model.

Second, the redundancy created by having alternative routes for message traffic enhances the fault tolerance of the e-mail system by ensuring that source site 205 and destination site 215 will be able to communicate when one of the communication paths fails.

A third advantage imparted by the many-to-few model is that the availability of alternative routes for message traffic allows the system administrator to distribute e-mail message traffic among two or more target servers; so that no one server becomes overloaded. This distribution of message traffic among two or more communications paths is referred to as "load balancing."

Load balancing may be achieved through the use of a "cost-weighted" algorithm. In this technique, it is assumed that the system administrator has assigned a "cost" (a numeric value, for example, between the arbitrary limits of 0 and 100) to each of the potential communications paths leading to a remote site. An assigned cost value has significance only relative to the other cost values assigned to the communications paths leading into the same remote site. For example, a lower assigned cost means that the associated communication path is preferable over another communication path that has a higher assigned cost and which leads into the same remote site.

The particular costs that are assigned to the potential communication paths depend on the policy objectives that the system administrator seeks to implement. For example, if one particular target server in a remote site is dedicated to the task of doing nothing but receiving and processing incoming message traffic, the system administrator will likely assign a low cost (relative to the costs assigned to the other target servers in that site) to the communication paths into that remote server so that the bulk of e-mail traffic entering the site will be routed through the dedicated server. On the other hand, if another target server in the remote site, in addition to receiving and processing e-mail traffic, performs other important functions that ordinarily should not be interrupted, or it has limited bandwidth or processing power, the system administrator likely will assign a high relative cost to the communication paths leading into that server so that it receives e-mail message traffic on an infrequent basis, for example, only 5% of the time or less.

Figure 4:
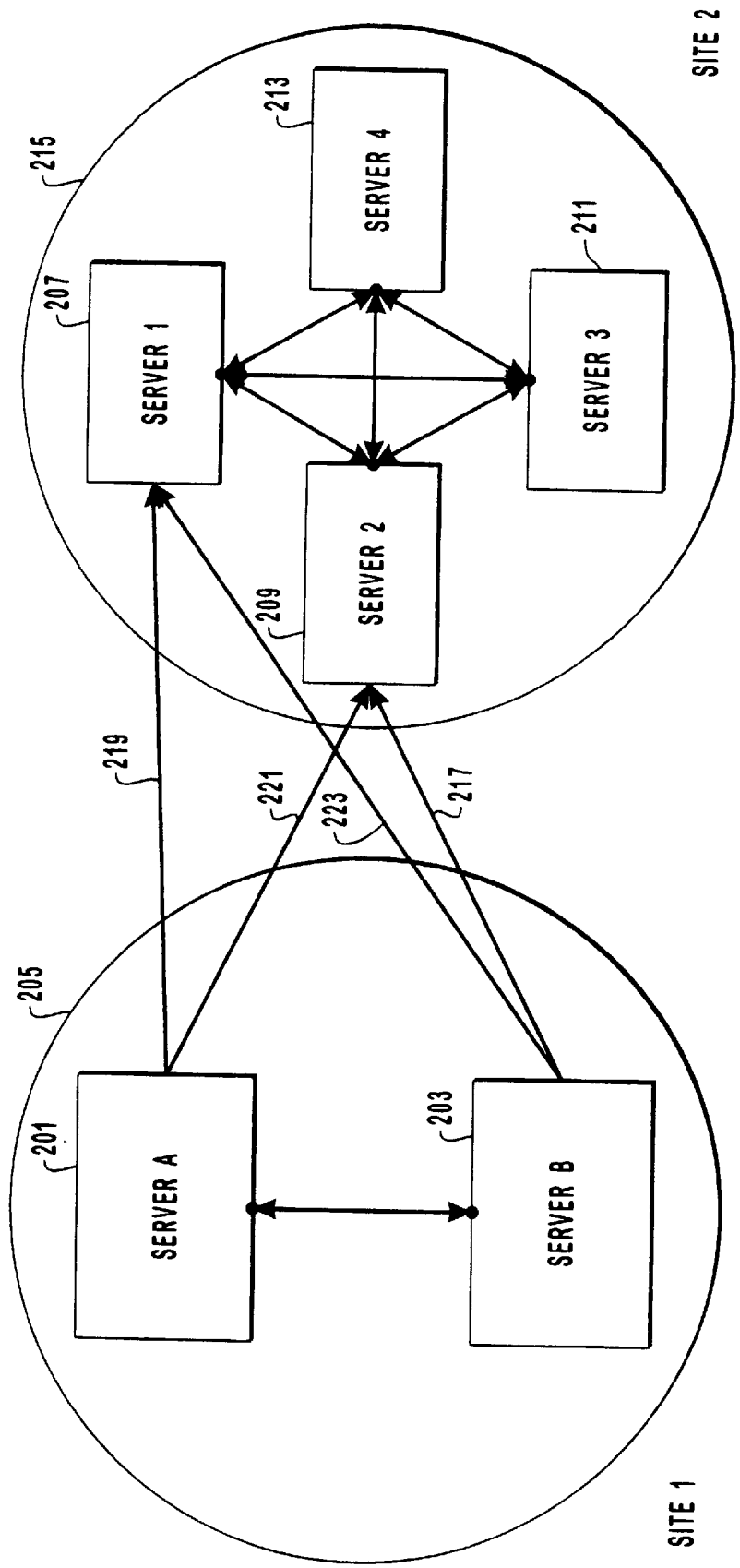

The assigned cost for a communication path is direction specific and may differ depending on which direction the message traffic is flowing. In FIG. 4, for example, the cost assigned to the communication path 221 between Server A and Server 2 might differ if the message was being sent from Server 2 to Server A instead of being sent from Server A to Server 2. In fact, the system administrator may configure the system, through techniques described below, such that Server 2 is not allowed to send messages to Server A, but rather only receive them. These capabilities further enhance the flexibility and control with which a system administrator may manage a multiple site e-mail system.

The cost-weighted algorithm also allows "special" cost values to be assigned to communications paths that are to be treated differently from the other communications paths. A system administrator may assign a cost value of 100 to a communication path that should be used only as a last resort—i.e., only when all other potential communications paths have "failed," which typically is some sort of permanent or semi-permanent problem that prevents the communication path from functioning properly.

A special cost value of 0 may be assigned to a communication path that, under ordinary circumstances, should be used for all messages entering the site. Other communications paths are considered for use only when the zero cost communication path has failed.

Although the embodiment described above uses cost values in the range of 0 to 100 inclusive, any other range of values may be implemented as desired. Moreover-, additional or different special cost values other than 0 and 100 may be implemented as appropriate to suit the needs of the system administrator for a particular e-mail system.

Figure 5:
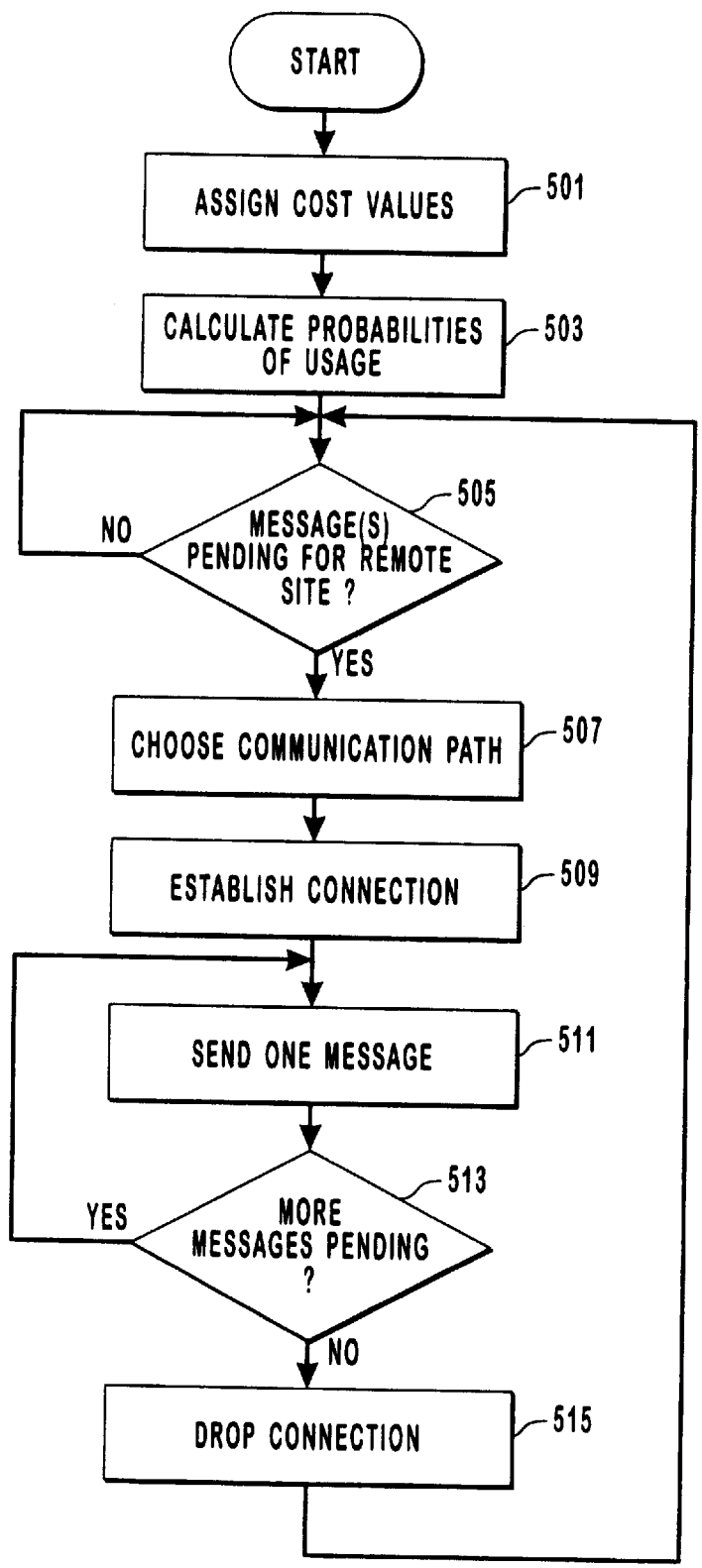
FIG. 5 is a flowchart of cost-weighted load balancing as applied to the e-mail system configuration shown in FIG. 6.
Figure 6:
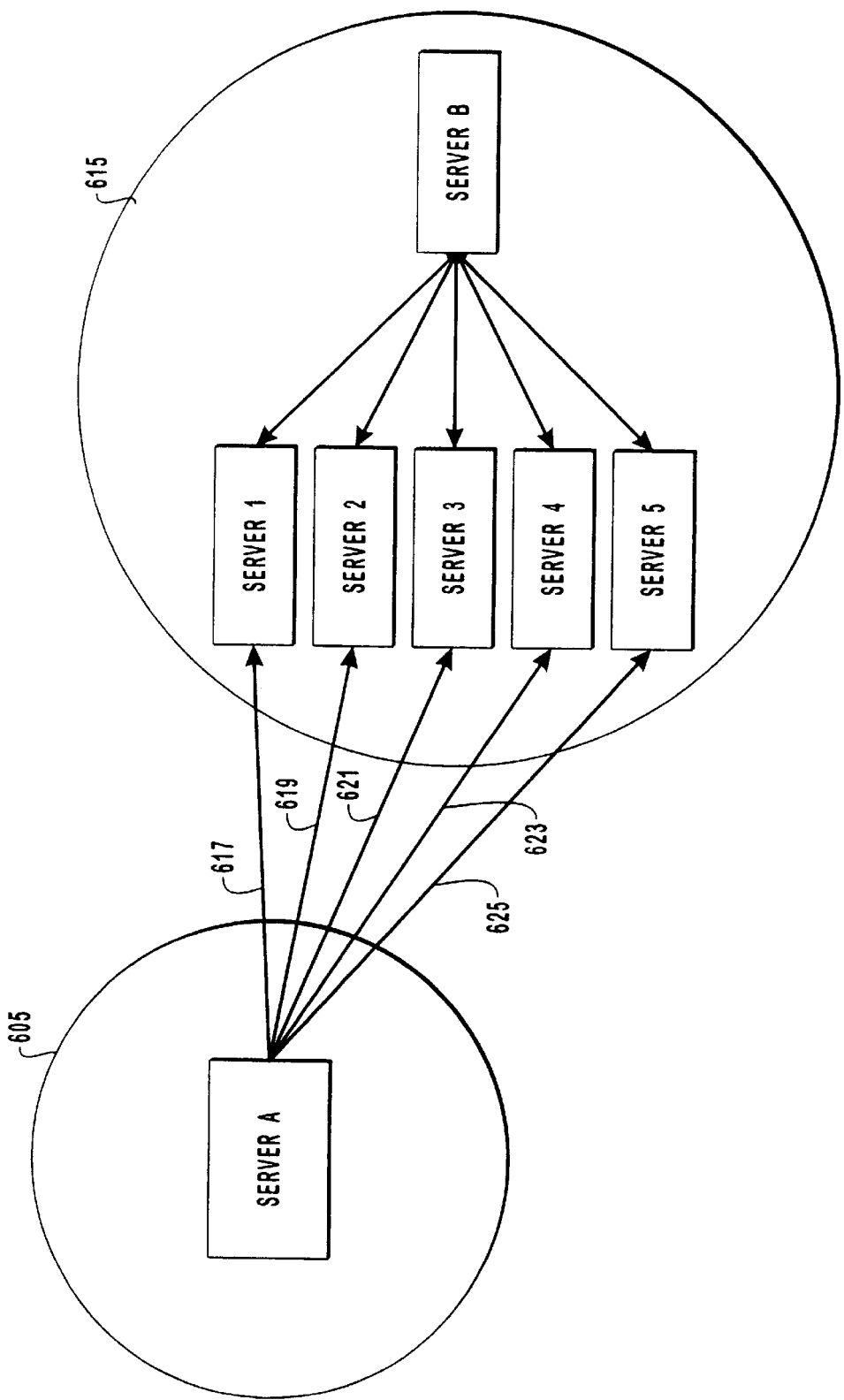
FIGS. 6–8 are logical block diagrams showing examples of e-mail system configurations.

A hypothetical example of a cost-weighted technique is described with reference to the flowchart of FIG. 5. This example is based on the two site LAN configuration shown in FIG. 6 but the underlying technique is applicable to any arbitrary number of sites. In FIG. 6, the source site 605 is illustrated as having only a single server, Server A, but it could have any number of servers, each of which would be treated in the same manner as Server A when it sends a message to the destination site 615.

The destination site 615 in FIG. 6 has six servers, five of which (Servers 1–5) are designated as target servers. The intrasite communications paths between Servers 1–5 in the destination site 615 are omitted for the sake of simplicity but it is assumed that each of the six servers in destination site 615 has direct RPC connectivity to the other five servers in that site.

In step 501 of FIG. 5, the system administrator assigns a relative cost value to each of the different communications paths leading into the destination site, for example, as follows:

path 617 into Server 1: cost(1)=5
path 619 into Server 2: cost(2)=50
path 621 into Server 3: cost(3)=50
path 623 into Server 4: cost(4)=75
path 625 into Server 5: cost(5)=100

This step is typically performed off-line—i.e., before the e-mail application has been launched, but it could also be performed in a dynamic manner—i.e., while the e-mail application was running. The cost values conceivably could be automatically altered by a software process to adapt to changing network conditions. In any event, these cost values are stored and may be read by software processes executing on the servers in the source site.

Once the cost values have been assigned, a corresponding "probability-of-usage," P, may be calculated for each of the potential communications paths using equation (i) below, where n is the number of the communication path under consideration and N is the total number of potential communication paths.

$$P(n) = \frac{100 - \text{cost}(n)}{(100 - \text{cost}(1)) + \ldots + (100 - \text{cost}(N))} \quad (i)$$

Communication paths having special assigned cost values (e.g., 0 or 100) are not included in the probability-of-usage calculations.

These probabilities-of-usage may also be thought of as statistical weighting factors in that a higher probability-of-usage means that a communication path has a greater "weight" (a numeric value whose magnitude influences the outcome of a computation) and thus is more likely to be chosen. Relative to the other communication paths, the weight associated with a specific communication path is roughly inversely proportional to the cost assigned to that path by the system administrator.

For the cost values assigned to Servers 1–5 in FIG. 6, the probabilities-of-usage for the four servers are calculated as follows:

$$P(1) = \frac{100 - 5}{(100 - 5) + (100 - 50) + (100 - 50) + (100 - 75)}$$
$$= 43.2\%$$

$$P(2) = \frac{100 - 50}{(100 - 5) + (100 - 50) + (100 - 50) + (100 - 75)}$$
$$= 22.7\%$$

$$P(3) = \frac{100 - 50}{(100 - 5) + (100 - 50) + (100 - 50) + (100 - 75)}$$
$$= 22.7\%$$

$$P(4) = \frac{100 - 75}{(100 - 5) + (100 - 50) + (100 - 50) + (100 - 75)}$$
$$= 11.4\%$$

$P(5) = 0\%$ (by definition when cost = 100)

At step 505, it is determined whether Server A has a request pending to send one or more messages to a server in destination site 615. Assume, for example, that an end-user located on Server A at source site 605 has initiated the transfer of a message to an end-user located at Server 6 in destination site 615. In that case, a communication path to be used for transmitting the message is chosen in step 507 according to the probabilities of usage calculated in step 503. Based on the particular values used in this example, a 43.2% chance exists that path 617 into Server 1 will be chosen; a 22.7% chance exits that path 619 into Server 2 will be chosen; a 22.7% chance that path 621 into Server 3 will be chosen; and a 11.4% chance exists that path 623 into Server 4 will be chosen.

Because the cost value assigned to communication path 625 into Server is a special cost value, by definition a 0% chance exists that path 625 will be chosen to receive incoming message traffic under normal circumstances. However, if all of the four other communication paths 617, 619, 623 and 625 have been tried and failed, path 625 will be chosen as the communication path of last resort.

Assume that in step 507, the path having the highest probability-of-usage—path 617 into Server 1—was chosen as the intersite communication path to be used to transport the message from Server A in source site 605 to Server 6 in destination site 615. At step 509, server A establishes a connection with Server 1 via path 617 using the RPC protocol and the message is sent to Server 1 in step 511. Upon receipt, Server 1 forwards the message to its ultimate recipient at Server 6, thereby completing the delivery of the message.

If it is determined at step 513 that more messages are pending transfer from Server A in site 605 to any server in site 615, control returns to step 511 for the next message to be sent. This loop continues until all pending messages in Server A that were to be sent to site 615 are transferred.

Once all of the messages have been sent, the connection to Server 1 via communication path 617 is dropped in step 515 and control is returned to step 505 to wait for the next intersite message transmission sequence to be initiated.

A single message transmission sequence may result in one or more individual messages being sent over a communication path, each individual message being sent one after another until no more remain. For each separate message transmission sequence, a new communication path is chosen in step 507 using the same probabilities-of-usage until the system administrator changes the cost values, at which point new probabilities-of-usage would be calculated as used in selecting a communication path. Accordingly, each iteration of path selection in step 507 will be independent of all past path selections. The number of individual messages in a message transmission sequence, as well as the size (e.g., number of bytes) of the messages being transmitted have no effect on which communication path is chosen. Rather, the probabilities-of-usage determine the likelihood that a certain communication path will be acquired and used for each new message transmission sequence, regardless of how many messages or bytes are ultimately transferred during the sequence.

The concepts underlying the many-to-one and many-to-few connectivity models, as well as the load balancing techniques described above, may be applied internally within the source site by using one or more "bridgehead" servers through which all outgoing message traffic to a remote site is channeled. When a server has been designated as a bridgehead, it means that it is allowed to send messages off site. Other servers in the site that are not bridgehead servers must route any messages bound for a remote site through a bridgehead server, which then sends the message to the destination site. The use of a bridgehead server for outbound message traffic reduces the number of direct intersite communications paths and thus simplifies the network.

Figure 7:
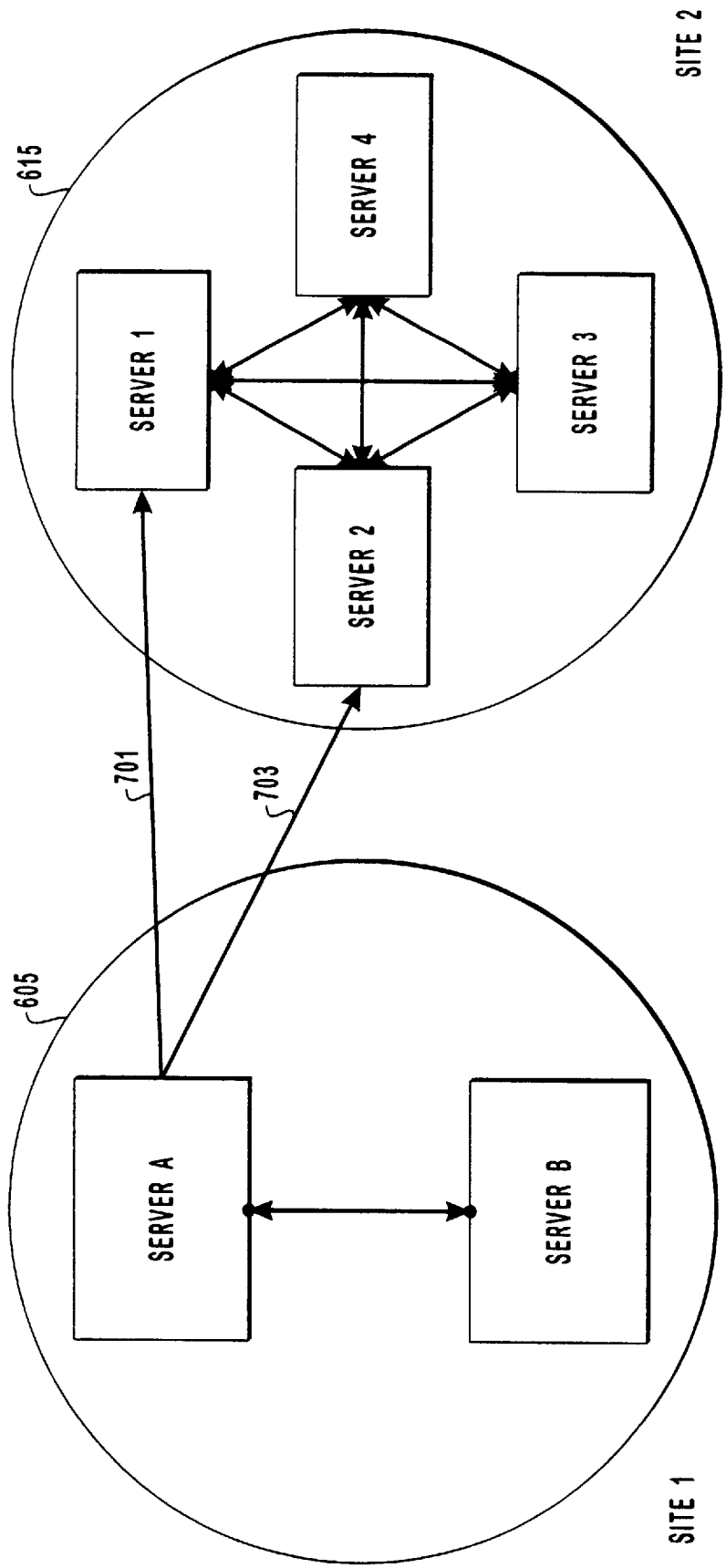

FIG. 7 shows an example of a two site configuration in which source site 605 uses Server A as its bridgehead server. All communications paths (two in the example illustrated, path 701 and path 703) out of site 605 originate at Server A. If an end-user connected to Server B in site 605 wants to send a message to another end-user connected to a server in destination site 615—Server 3, for example—Server B first must send the message to Server A which then forwards it, for example, to Server 2 in site 615, which in turn forwards the message to its ultimate recipient at Server 3. The configuration of FIG. 7 is referred to as a "one-to-many" connectivity model.

Figure 8:
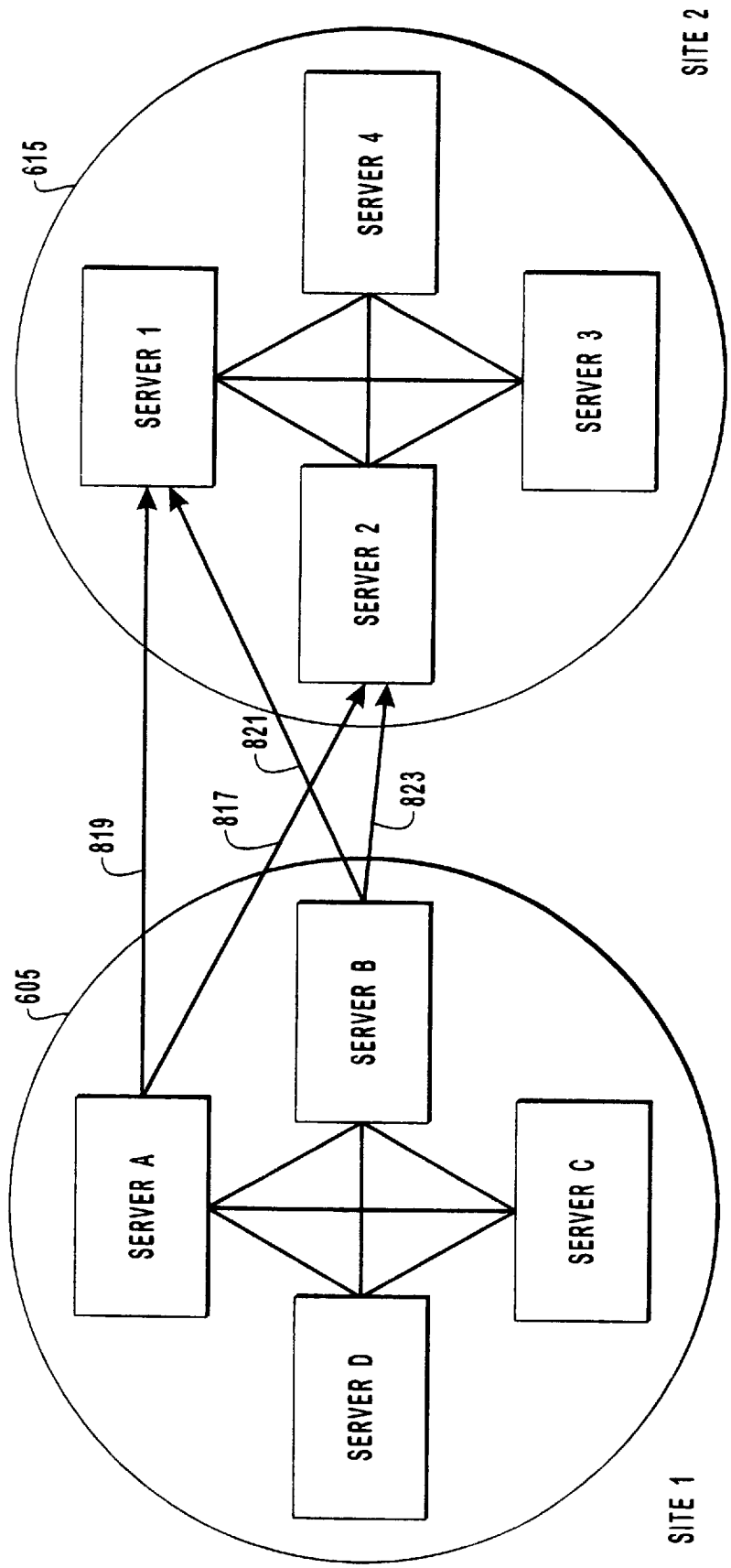

Alternatively, multiple bridgehead servers may be used in the source site to realize a "few-to-many" intersite connectivity model as shown in FIG. 8. In this model, servers in the source site 605 have two independent gateways through which message traffic may travel to the destination site 615—namely, either through Server A (via communication paths 817 or 819) or through Server B (via communication paths 821 or 823).

This configuration provides several advantages: it reduces the required number of communication paths relative to the one-to-one connectivity model; it provides fault tolerance through the presence of redundant communication paths; and it allows outbound message traffic from source site 605 to be load balanced between multiple bridgehead servers.

Whichever configuration a system administrator decides to implement—one-to-one, many-to-one, many-to-few, one-to-many, few-to-many, or something else—has its attendant advantages and disadvantages. For example, the one-to-one intersite connectivity model provides direct access between any two servers in the LAN without regard to the particular site in which each may be respectively located. The fact that any other server in the e-mail system is just one hop away means that messages will be delivered faster and that less computation time will be used in making routing and delivery decisions. At the same time, the large number of communications paths that a one-to-one model requires makes it impractical for a LAN that has more than just a few sites.

Under the many-to-one, many-to-few, one-to-many, and few-to-many connectivity models, the delivery latency for email messages may be increased because two or more hops may be required to deliver a message rather than just one (e.g, in FIG. 4, a message from Server A in source site 205 to Server 4 in destination site 215 would undergo a first hop between Server A and Server 2 and a second hop between Server 2 and Server 4). In addition, these alternative configurations may require that additional overhead information be appended to each message so that the target server and/or the bridgehead server will be able to route messages to the proper destination servers.

A summary of relative advantages and disadvantages for the various configurations is set forth in Table I below.

TABLE I

| Connection Type | Advantages | Disadvantages |
| --- | --- | --- |
| one-to-one | loads on the system and network are fairly predictable as the possible number of connections is known; easy to track a message or find a fault in the system as the messages can flow across one and only one possible route. | no built-in fault tolerance or redundancy. |
| many-to-one | each bridgehead server can make a direct connection to the target server and thus reduce routing "hops"; fairly easy to track messages because | no fault tolerance as a single failure at the destination site can impede all message traffic; no redundancy or load balancing available |

TABLE I-continued

| Connection Type | Advantages | Disadvantages |
| --- | --- | --- |
| | each message must flow into a single destination; some redundancy and load balancing available at the source site. | at the destination site. |
| many-to-few | allows for fault tolerance and redundancy in the communications paths; provides load balancing across a controlled list of servers in both the source and destination sites. | can necessitate additional hops for a message to get from the originator's system to the ultimate destination server; requires some degree of knowledge on the part of the system administrator to understand the network topology and system loads so that proper choices can be made. |
| few-to-many many-to-many | same as many-to-few a message typically is only one hop away from the proper destination server; little administrative overhead is required as all systems are always utilized; provides for full fault tolerance and redundancy. | same as many-to-few can consume a large amount of system level resources managing connections as any server in the topology may make a connection to the particular destination server at any time. |

Despite these potential tradeoffs, the connectivity models described above provide a system administrator with increased control and flexibility in regulating intersite message traffic. Depending on the particular policy objectives that the system administrator seeks to achieve, the use of one or more of these intersite connectivity models may provide considerable advantages over a one-to-one connectivity model. The factors that would go into a system administrator's decision of which connectivity model to use are many and varied and would depend on things such as the bandwidth and processing power available at each server, relative task urgency and importance, fault tolerance and the like.

The foregoing is a high level description of the concepts underlying the present invention. The specific details for implementing an embodiment will now be described.

As an initial matter, it should be noted that the intersite communications paths shown in FIGS. 2–4 and 6–8 represent logical, as opposed to physical, connections. Sites in a LAN are physically connected together by various connectivity components such as dedicated cable connections, modem-telephone line connections and/or wireless connections. A single physical connection is able to support multiple logical communications paths depending on factors such the bandwidth required for the various communication paths.

The ability to communicate across multiple sites in an integrated and cohesive manner may be achieved through the use of a "directory service"—a repository of information distributed across the LAN that defines which remote sites are reachable from any particular site and how those remote sites may be reached. The directory service includes a database that stores information concerning the attributes of the individual servers and end-users; of the e-mail system, including permissions and the like.

In one embodiment, each server maintains its own copy of the directory service database so that all servers within a single site will have access to the same information concerning remote sites. Each server also has its own directory service process by which other applications make requests to read and write information. Other embodiments are possible in which fewer instances of the directory service exist than the number of servers in the site. The only requirement is that each server have connectivity to an instance of the directory service in order that information can be read or written as appropriate. In addition, the use of a directory service is not necessary, but rather any other mechanism for storing and retrieving routing information may be used in its place.

One important component of the directory service is the site connector—a software object (defined as a discrete entity, comprising data and processes that act on that data, for performing a specific task) that facilitates intersite communications by configuring and managing RPC connections across different sites within the e-mail system. Each instance of the site connector object identifies one and only one remote site, and describes the connectivity between the local site and the designated remote site. A separate site connector object is provided for each remote site to which a potential connection exists.

Figure 9:
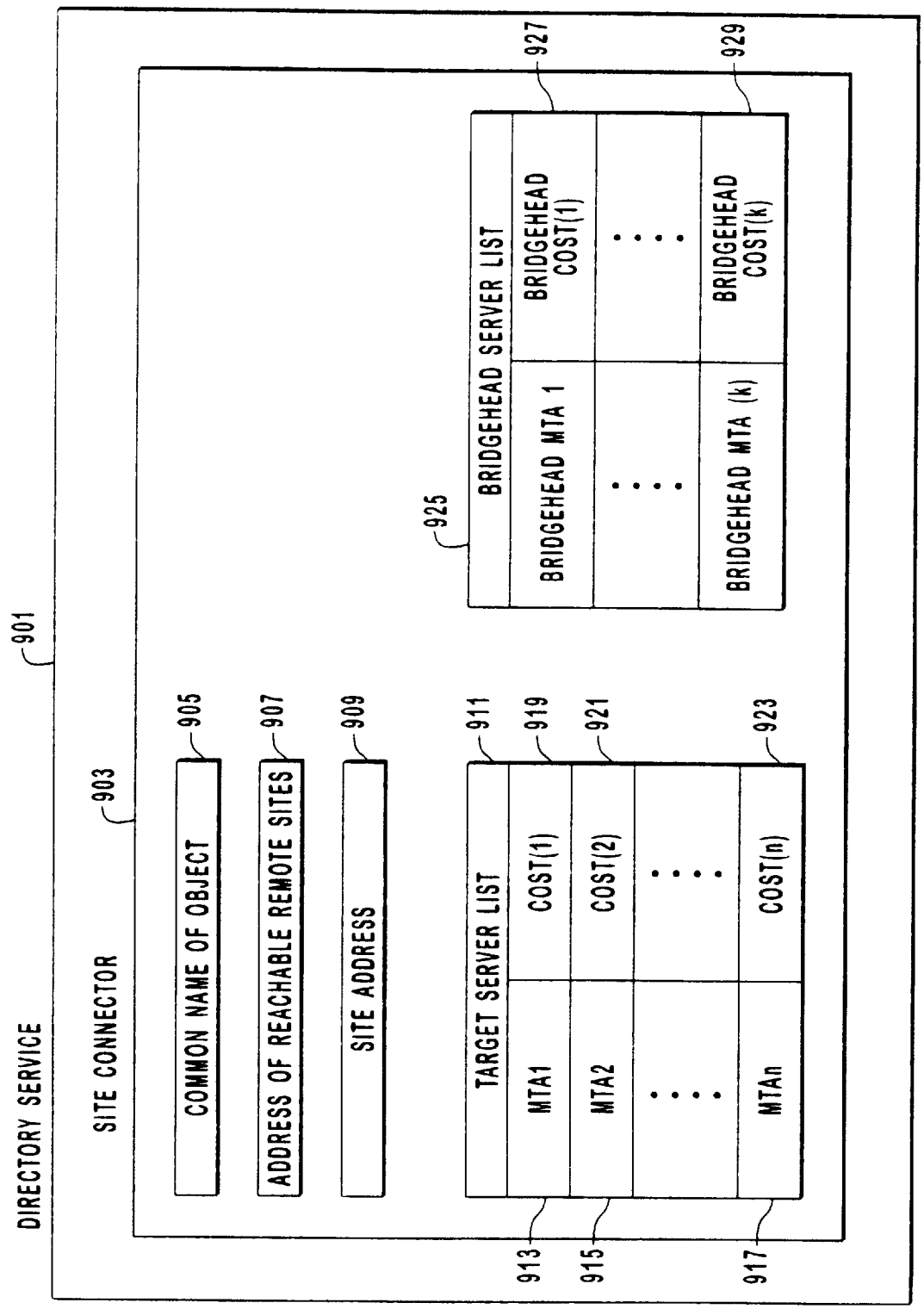
FIG. 9 is a data diagram representing a site connector object within a directory service.

FIG. 9 is a simplified representation of the site connector object 903 stored within the directory service 901. The site connector object includes its common name 905 within the directory service so that the site connector object may be located by other objects; a list of site addresses 907 of remote sites that are reachable from the source site for use in building a table of routing information; and the site address 909 of the source site.

A primary component of the site connector object 903 is the target server list 911, which is a table of the message transfer agents ("MTAs") (913, 915, 917) in the destination site that are potentially available to establish a communication path from the source site. An MTA is a program that executes on a server (each server has its own dedicated MTA) and which, when invoked, performs the handshaking functions with an MTA on another server, either within the same site or in a remote site, to establish a connection and exchange data with the other server. MTAs and their use are known in the art. The target server list potentially may identify any number of remote MTAs in the destination site, but only those MTAs listed are available to form a communication path between two servers. In FIG. 9, the remote MTAs are listed as MTA1, MTA2, . . . , MTAn, where n is a positive integer.

If cost-weighted load balancing as described above is implemented, the target server list 911 also includes the cost (919, 921, 923) assigned to each remote MTA listed. If the source site has a bridgehead server, a bridgehead server list 925 identifying the MTAs (MTA1 through MTAk where k is a positive integer) for the bridgehead server(s) in the source site also is included in the site connector object. The bridgehead server list also may include an associated cost value 927, 929 for each bridgehead server listed, which values may be used to perform intrasite load balancing when more than one bridgehead server is being used.

When a server in the source site (the "originating" server) wants to send a message to a server at the destination site, the MTA for the originating server reads the bridgehead server list 921 in the site connector object to see if a bridgehead server is implemented for the source site. If so, the message is forwarded to the bridgehead server so that its MTA will handle the transfer of the message to the destination site. All servers within a site may read the site connector object but only the bridgehead servers may invoke it to establish a connection to a remote site.

If more than one bridgehead server is listed in the bridgehead server list 921, load balancing across the bridgehead servers may be implemented. In one embodiment, this is accomplished by having the system administrator pre-assign a cost to each of the potentially available bridgehead servers. These assigned costs are not weighted; but rather the lowest cost bridgehead server is always chosen, absent failure. If two or more bridgehead servers have same assigned cost, one is randomly chosen from among the group of potential candidates.

If no bridgehead server is being used (or if bridgehead servers are being used and the originating server is a bridgehead server), the MTA for the originating server next reads the target server list 911 for the desired destination site to determine which MTAs at the destination site have been designated as potentially available for an RPC connection. The MTA for the originating server then chooses one of the MTAs listed in the target server list and uses it to establish a communication path between the originating server and the destination site server associated with the selected MTA.

For example, in the two site e-mail system of FIG. 4, in which Server 1 and Server 2 are the only servers in destination site 215 that are available to receive messages from servers in source site 205, a site connector object in the originating server in source site 205 would have a target server list with an entry for MTA1 (the MTA executing on Server 1 in destination site 215) and an entry for MTA2 (the MTA executing on Server 2 in destination site 215). If load balancing was being used, the target server list 911 also would include the relative costs that were previously assigned by the system administrator (i.e., cost(1) 919 for MTA1 and cost(2) 921 for MTA2).

Figure 10:
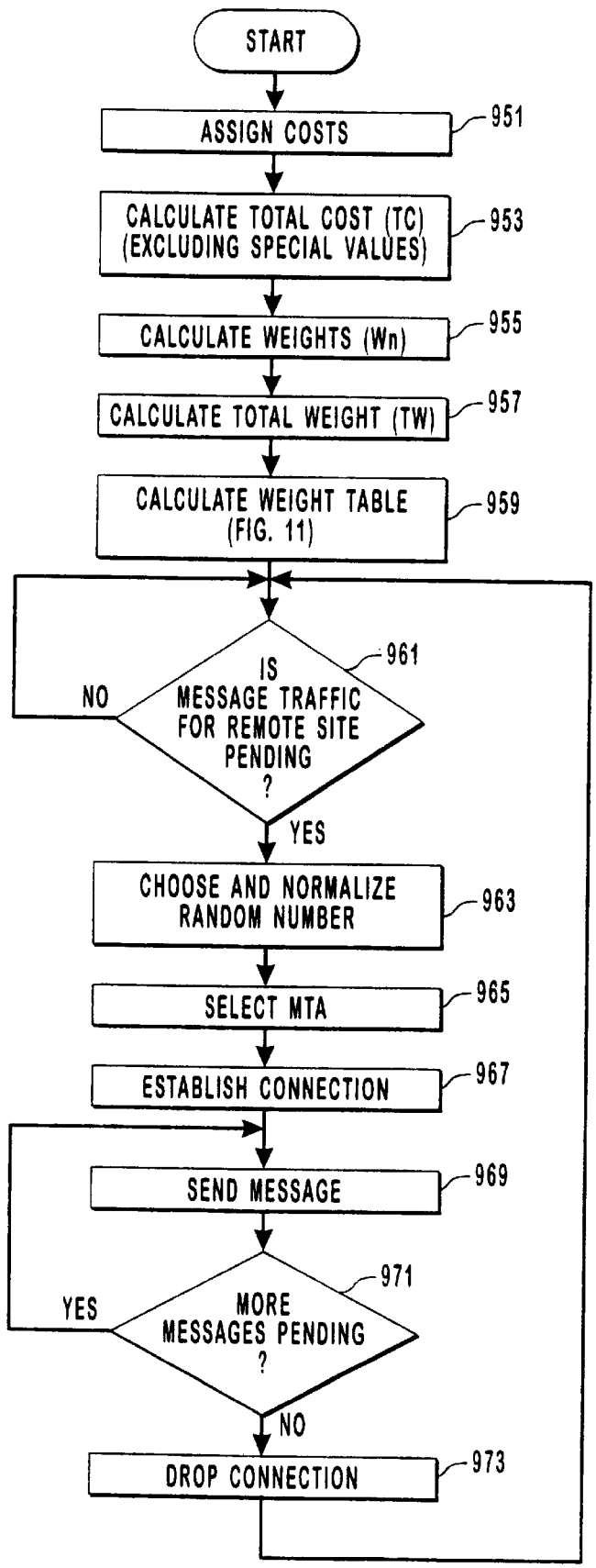
FIG. 10 is a flowchart of cost-weighted load balancing as applied to the e-mail system configuration shown in FIG. 6.

FIG. 10 is a flowchart of the load balancing algorithm that is implemented in an embodiment, as explained with reference to FIG. 6. This In step 951, the system administrator assigns a relative cost value to each of the potentially available MTAs in the remote site, in the manner as discussed above in connection with step 501 of FIG. 5. Assume that MTA1 is the MTA for Server 1 in destination site 615; MTA2 is the MTA for Server 2; MTA3 is the MTA for Server 3; MTA4 is the MTA for Server 4; and MTA5 is the MTA for Server 5. The same cost values as above are assigned by the administrator in this example:

cost(1) of MTA1=5;
cost(2) of MTA2=50;
cost(3) of MTA3=50;
cost(4) of MTA4=75; and
cost(5) of MTA5=100.

At step 953, the total cost, TC, is calculated by summing the cost of the individual MTAs, excluding any MTAs that have special cost values. In the example, the cost value for MTA5 is excluded from the following calculations because its cost value (100) indicates that it should be treated as a special case—e.g., not used unless all other MTAs have failed.

Such failure could result, for example, if the destination server to be reached is not powered up, if the MTA on the destination server is not running, or, potentially, if the destination server is too busy to accept another incoming connection request. Failure also may be caused by network outages that prevent the network RPC connection from being completed.

In any event, a "time-out" limit is imposed whenever an source MTA ia attempting to form a connection with a remote MTA. If an attempted connection fails, an MTA re-try timer is started which must count down to zero, for example, from 60 seconds, before the MTA attempts to establish the failed connection again. During the time that the re-try timer is counting down, the MTA will attempt to make a connection to another server on the target server list and will not attempt to make a connection with the failed destination server unless it is the only possible route to the destination site address space (e.g., it is the only remote MTA listed in the target server list).

The site connector has its own associated re-try timer (i.e., other than the individual timers maintained by the MTAs) which becomes active when all of the destination servers in the target server list have been tried and failed (e.g., a physical network problem has occurred). When that happens, the particular site connector under consideration will not be used until its re-try timer has counted down to zero, for example, from 60 seconds. If, however, the failed site connector is the only connector covering the destination site address space, a connection using the failed site connector will be attempted without regard to the status of its re-try timer.

Excluding the special cost value for MTA5, the total cost is calculated as follows:

$$
\begin{aligned}
TC &= \text{cost}(1) + \text{cost}(2) + \text{cost}(3) + \text{cost}(4) \\
&= 5 + 50 + 50 + 75 \\
&= 180
\end{aligned}
$$

Figure 11:
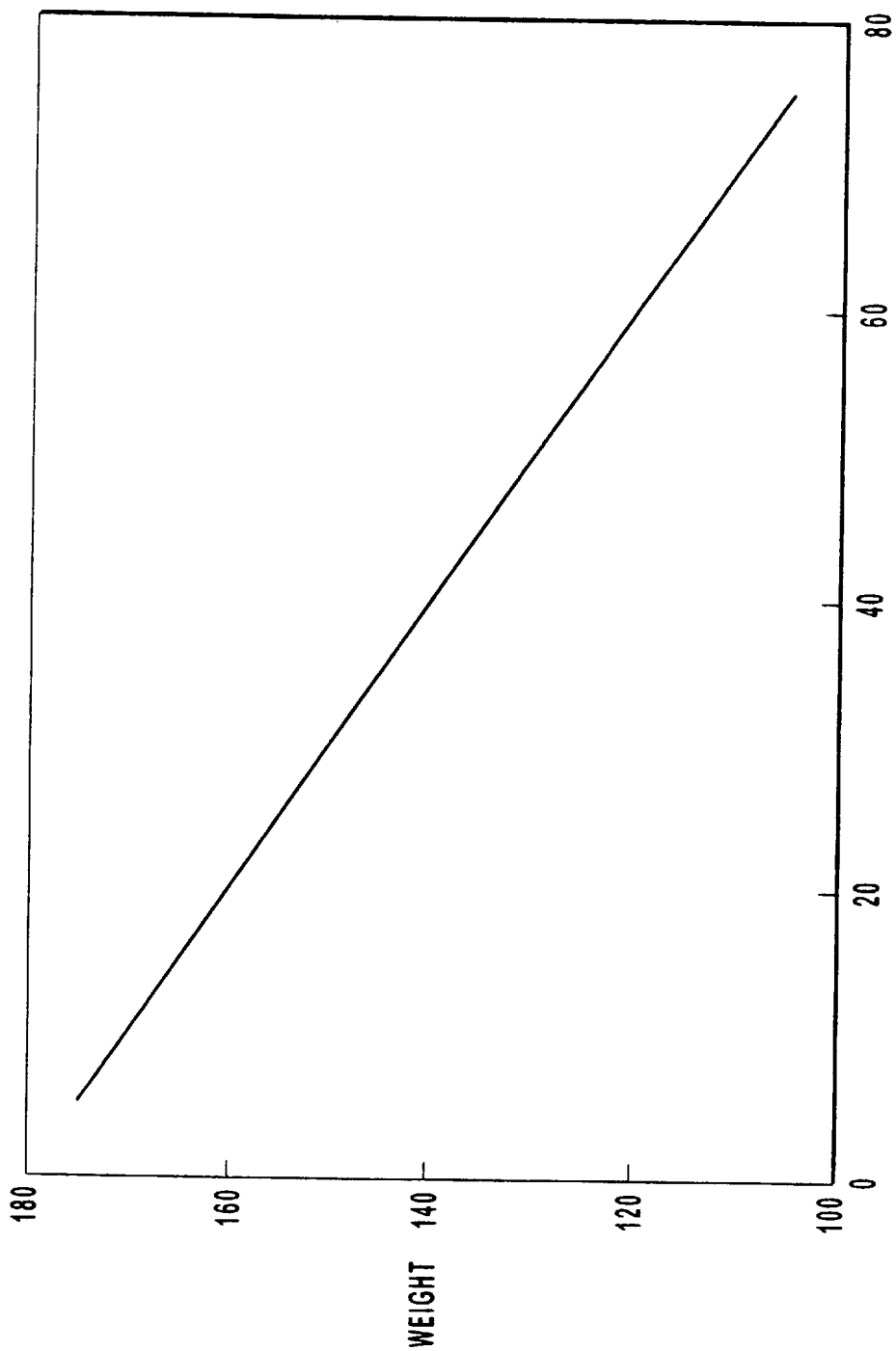
FIG. 11 is a X-Y graph of cost versus weight for the particular values represented in FIG. 12.

At step 955, the individual weight, W(n), of each MTA is calculated by deducting its cost from the total cost. FIG. 11 is a graph showing the relationship between assigned cost (X-axis) and calculated weight (Y-axis) for the particular values used in this example. As shown in FIG. 11, an MTA's weight decreases linearly with its cost. The general equation for calculating the weight of MTAn, where n is a positive integer is as follows:

$$W(n) = TC - \text{cost}(n)$$

Using the specific values for this example, the weights for MTA1 through MTA4 are:

$$W(1) = 180 - 5 = 175$$

$$W(2) = 180 - 50 = 130$$

$$W(3) = 180 - 50 = 130$$

$$W(4) = 180 - 75 = 105$$

At step 957, the total weight, TW, is calculated by summing the weights of the individual MTAs:

$$
\begin{aligned}
TW &= W(1) + W(2) + W(3) + W(4) \\
&= 175 + 130 + 130 + 105 \\
&= 540
\end{aligned}
$$

Figure 12:
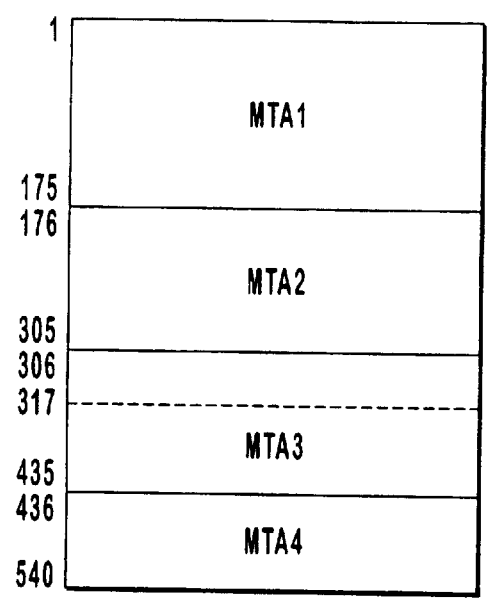
FIG. 12 is a data diagram example of a logical weight table.

At step 959, a logical weight table effectively is created as shown in FIG. 12. The weight table has a number of logical positions (540 in this example) equal to the sum of the weights of the MTAs. Each MTA is allocated a number of positions in the weight table according to its individual weight. An identifier for MTA1 is associated with the first 175 positions in the weight table (1–175) corresponding to its weight of 175. Similarly, based on their respective weights, an identifier for MTA2 is associated with the next 130 positions (176–305), an identifier for MTA3 is associated with the next 130 positions (306–435), and an identifier for MTA4 is associated with the last 105 positions in the table (436–540).

At step 961, it is determined whether Server A in source site 605 has any message traffic bound for destination site 615. If not, the following steps are not performed. Assume, however, that an end-user located on Server A at source site 605 has initiated the transfer of a message to an end-user located at Server 6 in destination site 615. In that case, at step 963, a random number is generated and normalized to fall within the range of 1 to TW, inclusive, using techniques that are well known in the art. For example, if a random 10 bit number were generated, the process could simply divide by the appropriate scale factor and round off.

At step 965, the random number resulting from step 961 is compared to the weight table. Assume that the random number is 317, for example, which falls into the range of the weight table that corresponds to MTA3 (306 to 435). Accordingly, at step 967, the MTA executing in Server A contacts MTA3, which is the MTA for Server 3 in destination site 615, and forms a logical communication path 621.

Control loops between steps 969 and 971 to sequentially transmit all pending messages from Server A bound for any server in destination site 615.

After all of the messages have been sent, the connection to MTA3 is dropped, thus ending the message transmission sequence. At this point, control returns to step 961 to await initiation of the next intersite message transmission sequence.

The techniques described above are not limited to email systems but rather find applicability in any network that transmits information between different nodes, or locations.

Moreover, the techniques described above may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. In an electronic message system having at least a first site and a second site, each site having one or more servers and the servers at the first site being linked with the servers at the second site by a plurality of alternative message routes, a method for transmitting information over said plurality of message routes according to a desired distribution which balances message traffic between the alternative message routes so as to facilitate efficient message distribution notwithstanding an arbitrarily large number of servers at any of the sites, the method comprising the steps of:

assigning a cost value to each alternative message route between the servers at the first site and servers at the second site, the cost value defining a desired relative frequency of usage of the message route to which the cost value is assigned, one of the alternative message routes having a special cost value assigned thereto;

calculating a weight for each alternative message route between the first site and the second site based on its assigned cost value, and based upon a comparison of the cost value of the particular message route to the combined cost values of all of said alternative message routes between said first site and said second site, the weight representing the relative probability of its corresponding message route being chosen for message transmission;

generating a message distribution scheme which will distribute electronic messages among all alternative message routes based upon the relative probability with which they will be chosen to transmit a message between servers at the first and second sites;

choosing a message route between the first site and the second site based on the distribution scheme; and transmitting a message over the chosen message route from the first site to the second site.

2. The method of claim 1 in which the step of assigning a cost value to each alternative message route is performed off-line by an administrator.

3. The method of claim 1 in which the step of assigning a cost value to each alternative message route, wherein, according to the distribution scheme, the message route associated with the special cost value has a 100% probability of being chosen in the choosing step.

4. The method of claim 3 in which the message is transmitted, in the transmitting step, over the associated message route, so long as the associated message route does not fail.

5. The method of claim 1 in which the step of assigning a cost value to each potential alternative message route, wherein, according to the distribution scheme, the message route associated with the special cost value has a 0% probability of being chosen in the choosing step.

6. The method of claim 5 in which according to the distribution scheme, no message is to be transmitted over the message route associated with the special cost value except when no other alternative message route is available.

7. The method of claim 1 in which the step of calculating a weight for each alternative message route comprises subtracting a particular message route's cost value from a sum of the cost values for the plurality of alternative message routes between the first site and the second site.

8. The method of claim 1 in which the step of generating a distribution scheme comprises:

constructing a weight table having a number of positions equal to a sum of the weights for the plurality of alternative message routes between the first site and the second site; and associating a number of positions in the weight table to each alternative message route equal to its weight.

9. The method of claim 8 in which the step of choosing comprises:

generating a random number;

comparing the random number with the weight table; and picking a message route having an assigned position in the weight table corresponding to the random number.

10. The method of claim 1 in which the step of choosing comprises generating a random number and evaluating the random number against the collective calculated weights.

11. The method of claim 1 in which the step of calculating a weight for each alternative message route is conducted such that the relative probability of choosing a message route having a low cost is higher than the relative probability of choosing a message route having a high cost.

12. The method of claim 1 in which the step of choosing a message route and the step of transmitting a message over the chosen message route are repeatedly conducted, and wherein the choosing is probabilistic such that an actual relative frequency of usage for each message route converges toward the desired relative frequency of usage for each message route as a cumulative number of transmissions from the first site to the second site increases.

13. The method of claim 1 in which the step of transmitting comprises performing a remote procedure call over the chosen message route.

14. The method of claim 1 in which the step of transmitting comprises transmitting a plurality of messages over the chosen message route.

15. The method of claim 1 further comprising repeating the step of choosing and the step of transmitting for each new message transmission sequence.

16. The method of claim 15 in which a plurality of individual messages are transmitted during each message transmission sequence.

17. The method of claim 1 further comprising repeating the step of choosing and the step of transmitting for a plurality of different sites in the electronic message system without reassigning costs values or recalculating weights.

18. The method of claim 1 in which the step of transmitting causes the message to pass from one site address space to another site address space.

19. In an electronic message system having at least a first site and a second site, each site having one or more servers and the servers at the first site being linked with the servers at the second site by a plurality of alternative message routes, a computer program product for implementing a method of transmitting information over said plurality of message routes according to a desired distribution which balances message traffic between the alternative message routes, the computer program product comprising:

a computer readable medium for carrying computer-executable instructions for implementing said method, wherein said computer readable medium stores cost values assigned to each alternative message route between the servers at the first site and the servers at the second site, the cost values defining a desired relative frequency of usage of the message route to which the cost value is assigned; and said computer-executable instructions comprising:

program code means for calculating a weight for each alternative message route between the first site and the second site based on its assigned cost value, and based upon a comparison of the cost value of the particular message route to the combined cost values of all of said alternative message routes between said first site and said second site, the weight representing the relative probability of its corresponding message route being chosen for message transmission, one of the alternative message routes having a special cost value assigned thereto;

program code means for generating a message distribution scheme which will distribute electronic messages among all alternative message routes based upon the relative probability with which they will be chosen to transmit a message between servers at the first and second sites;

program code means for choosing a message route between the first site and the second site based on the distribution scheme; and program code means for initiating transmission of one or more messages over the chosen message route from the first site to the second site.

20. The computer program product of claim 19 in which the program code means for choosing a message route comprise program code means for generating a random number.

21. The computer program product of claim 19 in which one of the cost values stored by tile computer readable medium is a special cost value, wherein, according to the distribution scheme, the message route associated with the special cost value has a 100% probability of being chosen by the program code means for choosing a message route.

22. The computer program product of claim 19 in which one of the cost values stored by the computer readable medium is a special cost value, wherein, according to the distribution scheme, the message route associated with the special cost value has a 0% probability of being chosen by the program code means for choosing a message route.

23. In an electronic message system having at least a first site and a second site, each site having one or more servers and the servers at the first site being linked with the servers at the second site by a plurality of alternative message routes, a method for transmitting information over said plurality of message routes according to a desired distribution which balances message traffic between the alternative message routes so as to facilitate efficient message distribution notwithstanding an arbitrarily large number of servers at any of the sites, the method comprising the steps of:

assigning a cost value to each alternative message route between the servers at the first site and the servers at the second site, the cost value defining a desired relative frequency of usage of the message route to which the cost value is assigned, one of the alternative message routes having a special cost value assigned thereto;

calculating a weight for each alternative message route between the first site and the second site based on its assigned cost value, and based upon a comparison of the cost value of the particular message route to the cost values of others of said alternative message routes between said first site and said second site, the weight representing the relative probability of its corresponding message route being chosen for message transmission;

generating a message distribution scheme which will distribute electronic messages among the alternative message routes based upon the relative probability with which they will be chosen to transmit a message between servers at the first and second sites, the message distribution scheme specifying that the message route associated with the special cost value is to be chosen to transmit the message only when no other alternative message route is available for message transmission; and transmitting a message from the first site to the second site, comprising the steps of:

choosing a message route from the first site to the second site based on the distribution scheme, and, if the chosen message route is available for message transmission, transmitting the message thereover; and if the chosen message route is unavailable for message transmission, continuing choosing alternative message routes until an available message route is chosen.

24. In an electronic message system having at least a first site and a second site, each site having one or more servers and the servers at the first site being linked with the servers at the second site by a plurality of alternative message routes, a method for transmitting information over said plurality of message routes according to a desired distribution which balances message traffic between the alternative message routes so as to facilitate efficient message distribution notwithstanding an arbitrarily large number of servers at any of the sites, the method comprising the steps of:

assigning a cost value to each alternative message route between the servers at the first site and the servers at the second site, the cost value defining a desired relative frequency of usage of the message route to which the cost value is assigned, one of the alternative message routes having a special cost value assigned thereto;

calculating a weight for each alternative message route that does not have the special cost value, based on its assigned cost value, and based upon a comparison of the cost value of the particular message route to the cost values of others of said alternative message rotates between said first site and said second site, the weight representing the relative probability of its corresponding message route being chosen for message transmission in the event that the message route associated with the special cost value is unavailable for message transmission;

generating a message distribution scheme which will distribute electronic messages among the alternative message routes based upon the relative probability with which they will be chosen for message transmission in the event that the massage route associated with the special cost value fails;

selecting the message route associated with the special cost value and, if the message route associated with the special cost value if it is available for message transmission, transmitting a message thereover from the first site to the second site; and in the event that the message route associated with the special cost value is unavailable for message transmission:

choosing another message route between the first site and the second site based on the distribution scheme; and transmitting said message over the chosen message route from the first site to the second site.

25. The method of claim 24 in which the step of assigning cost values comprises assigning a second special cost value to one of the alternative message routes, wherein the message distribution scheme specifies that the message route associated with the special cost value is to be chosen to transmit the message only when no other alternative message route is available for message transmission.

* * * * *

UNITED STATES PATENT AND TRADEMARK OFFICE
CERTIFICATE OF CORRECTION

Page 1 of 2

PATENT NO. : 5,872,930
DATED : February 16, 1999
INVENTOR(S) : Steven Paul Masters, Eric Neil Lockard It is certified that error appears in the above-identified patent and that said Letters Patent is hereby corrected as shown below:

Col. 1 ln. 62: after "servers" change "were" to --was--

Col. 6 ln. 44: after "Moreover" delete [-]

Col. 7 ln. 66: after "chance" change "exits" to --exists--

Col. 7 ln 67: after "chance" and before "that" insert --exists--

Col. 12 ln. 10: after "have" and before "same" insert --the--

Col. 12 ln. 37: before "In" delete [This]

Col. 12 ln 66: after "whenever" change "an" to --a--

Col. 12 ln 67: after "MTA" change "ia" to --is--

Col. 16 ln. 35: after "reassigning" change "costs" to --cost--

Col. 16 ln. 40: after "second site," change "cach" to --each--

Col. 17 ln. 18: before "computer" change "tile" to --the--

UNITED STATES PATENT AND TRADEMARK OFFICE
CERTIFICATE OF CORRECTION

PATENT NO. : 5,872,930
DATED : February 16, 1999
INVENTOR(S) : Steven Paul Masters, Eric Neil Lockard It is certified that error appears in the above-identified patent and that said Letters Patent is hereby corrected as shown below:

Col. 17 ln 63: after "and" and before "transmitting" insert paragraph break

Col. 18 ln. 30: after "message" change "rotates" to --routes--

Signed and Sealed this

Twenty-seventh Day of June, 2000

Attest:

Attesting Officer

Q. TODD DICKINSON

Director of Patents and Trademarks